(No Model.)

T. B. NUTTING.
GANG AND SULKY PLOW.

No. 287,851. Patented Nov. 6, 1883.

WITNESSES:
Chas. Nida
C. Sedgwick

INVENTOR:
T. B. Nutting
BY Munn & Co
ATTORNEYS.

United States Patent Office.

THOMAS B. NUTTING, OF MORRISTOWN, NEW JERSEY, ASSIGNOR TO HIMSELF AND THOMAS B. NUTTING, JR., OF SAME PLACE.

GANG AND SULKY PLOW.

SPECIFICATION forming part of Letters Patent No. 287,851, dated November 6, 1883.

Application filed February 14, 1883. (No model.)

*To all whom it may concern:*

Be it known that I, THOMAS B. NUTTING, of Morristown, in the county of Morris and State of New Jersey, have invented a new and useful Improvement in Gang and Sulky Plows, of which the following is a full, clear, and exact description.

Reference is to be had to the accompanying drawings, forming part of this specification, in which similar letters of reference indicate corresponding parts in all the figures.

Figure 1:
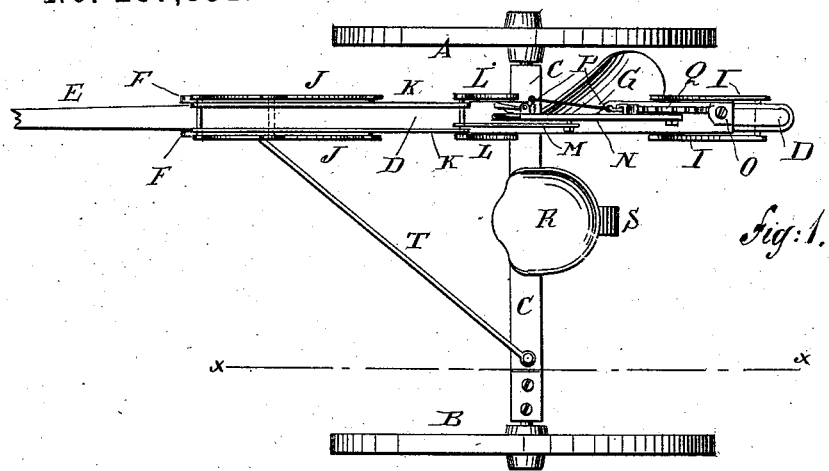
Figure 2:
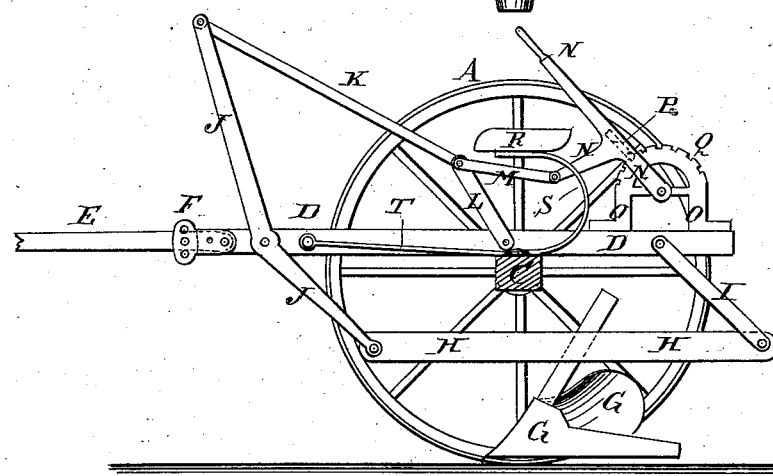
Figure 3:
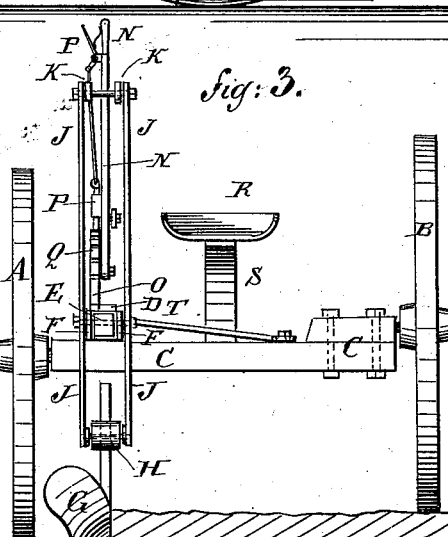

Figure 1 is a plan view of my improvement. Fig. 2 is a sectional elevation of the same, taken through the line $x\ x$, Fig. 1. Fig. 3 is a front elevation of the same.

The object of this invention is to promote convenience in controlling and operating gang and sulky plows.

The invention consists in a gang and sulky plow constructed with wheels and an axle, with which the plow is connected by levers, connecting-bars, and a three-armed lever, so that the plow will be held securely, and can be readily raised and lowered. The tongue is connected with the forward end of the beam carrying the plow by two connecting-plates, so that the said tongue can be adjusted to teams of different heights, while the said beam remains level, as will be hereinafter fully described.

A B are the wheels, and C is the axle, which is made in two parts, the adjacent ends of the said parts being placed one above the other and bolted together, so that the frame of the machine will be level while one wheel is in the furrow and the other upon the unplowed land.

To the axle C, near the furrow-wheel A, is bolted or otherwise firmly secured a beam, D, which serves as a frame for the machine, and to the forward end of which is secured the rear end of the tongue E by plates F, bolted to the sides of the adjacent ends of the said beam and tongue. The forward ends of the plates F have a number of holes formed in them to receive the fastening-bolt, so the tongue E can be adjusted to teams of different heights, while the beam D remains level.

G is the plow, to the rear end of the beam H of which are hinged by a bolt the lower ends of two bars, I. The upper ends of the bars I are hinged by a bolt to the rear part of the beam D.

To the forward part of the plow-beam H are hinged by a bolt the lower ends of two levers, J, which are fulcrumed by a bolt to the forward part of the beam D.

To and between the upper ends of the levers J is hinged by a bolt the forward ends of the connecting-bars K, the rear ends of which are hinged by a bolt to and between the adjacent ends of two pairs of bars, L M. The lower ends of the bars L are hinged by a bolt to the middle part of the beam D. The rear ends of the bars M are hinged to the forward arm of the three-armed lever N, the lower arm of which is hinged to the beam D, or to a support, O, attached to the said beam. The upper arm of the lever N projects into such a position as to be readily reached and operated by the driver from his seat to raise and lower the plow. The lever N, and consequently the plow, is held securely in any position into which it may be adjusted by a lever-pawl, P, connected with the said lever, and which engages with the teeth of the curved catch-bar Q, formed upon or attached to the support O, or to the beam D. The driver's seat R is attached to the upper end of a spring-support, S, the lower end of which is attached to the axle C. The connection between the beam D and the axle C is strengthened by a brace, T, attached to the said beam and axle. With this construction the plow can be readily raised and lowered, and adjusted to work at any desired depth in the ground. With this construction, also, the plow will be supported while at work, so that there will be no downward pressure upon the bottom of the furrow.

One, two, or more plows can be used, as may be desired.

By reason of the long lever-connection the extent of adjustment of the operating hand-lever is reduced to a minimum.

Having thus described my invention, what I claim as new, and desire to secure by Letters Patent, is—

In a gang or sulky plow, the combination, with the horizontal plow-beam H and the frame-beam D, of the link I, pivoted to the rear end of beam D and to the plow-beam, the approximately bell-crank-shaped levers J, pivoted at about their centers to near the forward end of beam D, and hand-lever N, connected to the beam D and to the lever J by means of the compound toggle-connection K L M, whereby the plow is drawn through the ground without causing downward pressure on the bottom of the furrow, substantially as set forth.

THOMAS B. NUTTING.

Witnesses:
JAMES T. GRAHAM,
C. SEDGWICK.